(12) United States Patent
Dinkel et al.

(10) Patent No.: US 7,785,086 B2
(45) Date of Patent: Aug. 31, 2010

(54) SUPPLY DEVICE

(75) Inventors: Dieter Dinkel, Schwalbach (DE); Axel Hinz, Neu-Anspach (DE); Albrecht Otto, Schöneck (DE); Hans-Georg Zentgraf, Rüsselsheim (DE); Daniel Zuk, Wiesbaden (DE)

(73) Assignee: Continental Teves AG & Co. oHG (DE)

( * ) Notice: Subject to any disclaimer, the term of this patent is extended or adjusted under 35 U.S.C. 154(b) by 937 days.

(21) Appl. No.: 10/529,159

(22) PCT Filed: Sep. 23, 2003

(86) PCT No.: PCT/EP03/10561

§ 371 (c)(1),
(2), (4) Date: Mar. 24, 2005

(87) PCT Pub. No.: WO2004/028878

PCT Pub. Date: Apr. 8, 2004

(65) Prior Publication Data

US 2005/0265872 A1 Dec. 1, 2005

(30) Foreign Application Priority Data

Sep. 24, 2002 (DE) .............................. 102 44 374

(51) Int. Cl.
*F04B 39/10* (2006.01)
*F04B 53/10* (2006.01)
(52) U.S. Cl. ...................... 417/569; 417/470; 417/549; 137/454.4; 92/135; 92/192
(58) Field of Classification Search ............... 417/470, 417/549, 471, 415, 545, 569, 554; 137/454.4; 303/10, 11, 116.4; 92/135, 192
See application file for complete search history.

(56) References Cited

U.S. PATENT DOCUMENTS

| 6,146,115 | A  | * | 11/2000 | Alaze ........................ 417/549 |
| 6,224,352 | B1 | * | 5/2001  | Hauser et al. ............... 417/313 |
| 6,302,663 | B1 | * | 10/2001 | Schuller et al. ............. 417/554 |
| 6,340,295 | B1 | * | 1/2002  | Hauser et al. ............... 417/470 |
| 6,361,295 | B2 | * | 3/2002  | Schuller et al. ............. 417/549 |

(Continued)

FOREIGN PATENT DOCUMENTS

DE          93 19 462          4/1995

(Continued)

*Primary Examiner*—Devon C Kramer
*Assistant Examiner*—Leonard J Weinstein
(74) *Attorney, Agent, or Firm*—RatnerPrestia

(57) ABSTRACT

The invention relates to a supply device for the supply of pressure fluid into at least one vehicle brake or into a pressure fluid accumulator, wherein a piston is movably arranged in an accommodating member, a carrier bears a non-return valve arranged coaxially to the piston for the purpose of ventilating a working chamber into which the piston plunges, and wherein a resetting spring is arranged between the carrier and the piston.

It is the essence of the invention that a multi-piece cage allows inserting the resetting Spring into the cage parts, the cage parts comprise fastening means that lock the cage due to relative displacement of the cage parts, and the resetting spring is caged and simultaneously elastically preloaded under the relative displacement of the cage parts.

6 Claims, 3 Drawing Sheets

U.S. PATENT DOCUMENTS

| | | | |
|---|---|---|---|
| 6,450,787 B1 * | 9/2002 | Risch et al. | 417/569 |
| 6,497,562 B1 * | 12/2002 | Greiff et al. | 417/560 |
| 6,652,245 B2 * | 11/2003 | Hauser et al. | 417/313 |
| 6,764,286 B2 * | 7/2004 | Hunnicutt et al. | 417/470 |
| 6,786,232 B2 * | 9/2004 | Schuller et al. | 137/543.17 |
| 6,866,489 B2 * | 3/2005 | Hinz et al. | 417/470 |
| 2001/0048884 A1 * | 12/2001 | Siegel et al. | 417/470 |
| 2001/0056259 A1 * | 12/2001 | Skinkle et al. | 604/151 |
| 2002/0155008 A1 * | 10/2002 | Hauser et al. | 417/313 |
| 2003/0053920 A1 * | 3/2003 | Hinz et al. | 417/470 |

FOREIGN PATENT DOCUMENTS

| | | | |
|---|---|---|---|
| DE | 197 32 771 A | | 2/1999 |
| DE | 19820136 A1 | * | 8/1999 |
| WO | WO 95/16859 | | 6/1995 |
| WO | WO 99/06704 | | 2/1999 |
| WO | WO 9942725 A2 | * | 8/1999 |
| WO | WO01/70550 | * | 9/2001 |
| WO | WO 01/70550 A2 | | 9/2001 |
| WO | WO01/73294 | * | 10/2001 |

* cited by examiner

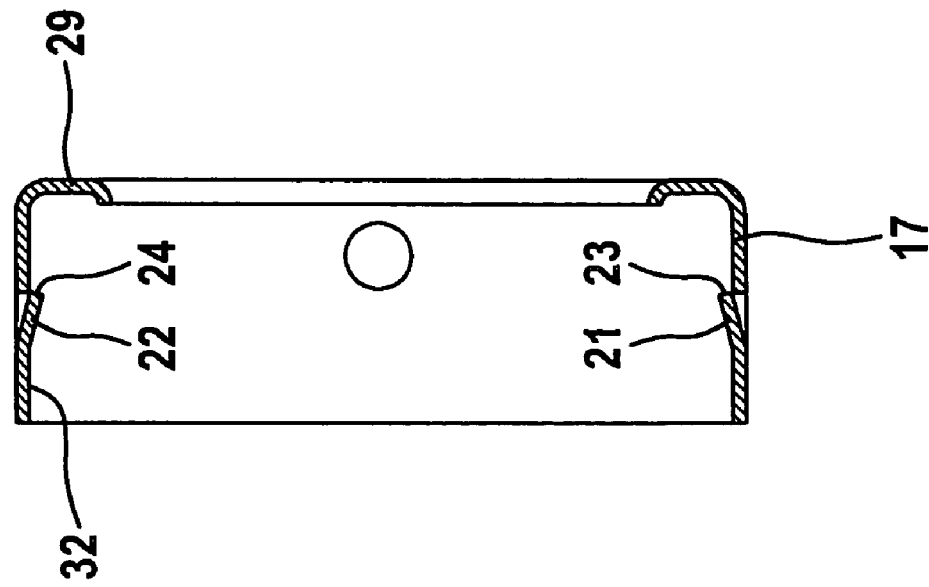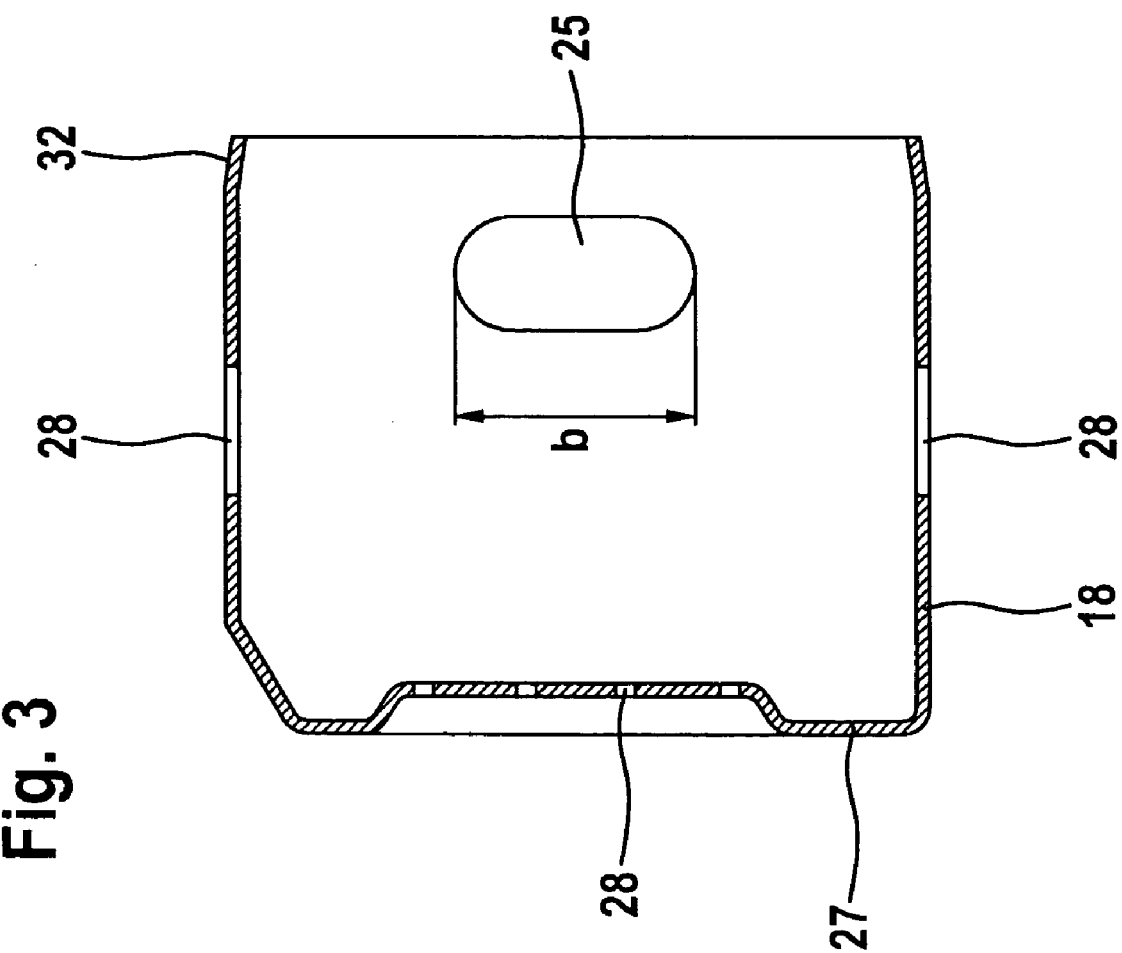

SUPPLY DEVICE

TECHNICAL FIELD

The present invention relates to a supply device for the supply of pressure fluid into at least one vehicle brake, or into a pressure fluid accumulator, or into a master brake cylinder, wherein a piston is movably arranged in an accommodating member, a carrier bears a non-return valve arranged coaxially to the piston for the purpose of ventilating a working chamber into which the piston plunges, and wherein a resetting spring is arranged between the carrier and the piston.

BACKGROUND OF THE INVENTION

EP 0 734 494 A1 discloses a supply device configured in this type. The piston is a component of a unit which may be handled independently. The unit additionally comprises a second non-return valve for the ventilation of the working chamber, and the resetting spring. This arrangement allows inserting the mentioned components as a unit into a bore in the accommodating member. In a separate step the carrier for the non-return valve is inserted into the extended bore, while the resetting spring is elastically preloaded at the same time. The process reliability of this mounting operation needs improvement because the resetting spring may buckle under increasing preload. To prevent this, special adaptation measures are provided. Those measures shall be avoided.

BRIEF SUMMARY OF THE INVENTION

An object of the invention is to provide a supply device having a design that permits a simplified assembly by forming modular units and a preload of the resetting spring.

This object is achieved by a multi-piece cage which allows inserting the resetting spring into the cage parts, the cage parts comprising fastening means that lock the cage due to relative displacement of the cage parts, and the resetting spring is caged and simultaneously elastically preloaded under the relative displacement of the cage parts.

The invention allows simultaneous preloading of the resetting spring while joining the cage parts together, and vice-versa. The assembly process is worked outside the accommodating member of the component which accommodates the spring assembly after installation. The invention allows the pre-assembly of a return spring subunit. That is achieved by a division of working steps.

In a particularly preferred embodiment, a catch-type connection is provided for fastening the cage parts to one another, and a locking arm is provided on at least one cage part for engagement into a locking recess of an associated second cage part. This arrangement avoids cost-intensive separate fastening steps such as a welding operation or a beading operation.

Several fastening means, preferably arranged in pairs and diametrically opposite each other are provided at each cage part in a further favorable embodiment of the invention. Safe accommodation of the spring forces in the cage is thereby rendered possible with little effort. It is principally feasible to raise the number of fastening means.

The opposed fastening means of a cage component preferably have an equal design what facilitates the fabrication by tools when the cage parts are made from sheet-metal material. In addition, the feeding of parts in an automatic assembly process can be simplified. It is, however, also possible to provide in each case different fastening means without departing from the spirit of the invention.

Joining of the cage parts is facilitated when each cage part includes at least one separate portion for centering a portion of a cage part to be fastened. Besides, if desired, there is no need for separate sorting processes or position-aligning operations during the assembly. According to a preferable variant of the invention, the fastening means are arranged in such a fashion, without possibly needing a separate portion for centering purposes, that a rotational alignment of the cage components with respect to the component axis can be omitted. This is brought about because the cage parts include more locking arms than locking recesses, and the locking arms in the circumferential direction of the cage parts have a considerably smaller width than a width of the locking recesses so that cage parts that are arranged in an optionally twisted relative position to each other in a circumferential direction of the cage parts are directly lockable. Details of this embodiment can be taken from the sub claims.

The influence of component tolerances is minimized because a cage part has a cylindrical wall with which the cage is accommodated in a carrier for forming a modular unit, and the carrier-side accommodating area is provided independently of and spaced from the fastening means for the cage parts. Therefore, e.g. a dimensional discrepancy in the accommodating area does not have any direct effect on the attachment of the cage parts to each other, and vice-versa.

A subordinate patent claim discloses a spring assembly comprising two cage parts and a resetting spring for use in an electronically controlled brake system.

BRIEF DESCRIPTION OF THE DRAWINGS

FIG. 2 is a cross-sectional view of a first cage part with locking arms.

FIG. 3 is a cross-sectional view of a second cage part with a locking recess.

DETAILED DESCRIPTION OF THE PREFERRED EMBODIMENTS

Figure 1:
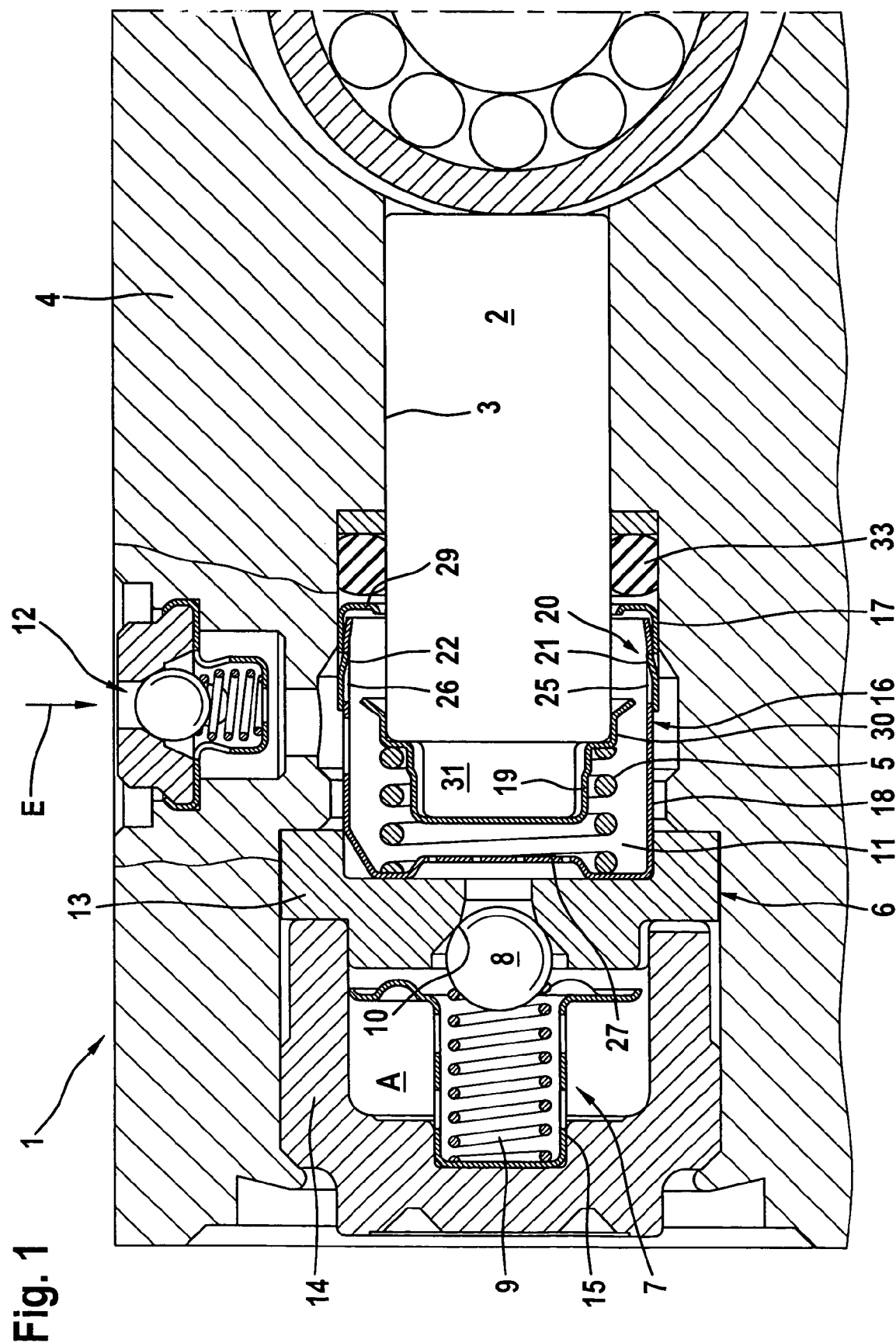
FIG. 1 is a cross-sectional view of a supply device.

FIG. 1 shows a supply device 1 having a piston 2 that is arranged and guided so as to be movable in a bore 3 of an accommodating member 4, which latter is a component of an electrohydraulic assembly equipped with an electronic control unit (ECU). To guide the piston 2, it is also possible to use a bushing inserted into the bore 3 or, as will be described in the following, a combined solution in which the bushing, cage 16 and non-return valve 7 form an assembly. Further, the accommodating member 4 includes non-illustrated, electromagnetically actuatable valves and channels (not shown) connecting the valves and allowing the supply of pressure fluid out of a working chamber 11 into a non-illustrated pressure-fluid accumulator or into non-illustrated vehicle brakes for the purpose of a controlled pressure increase. This arrangement enables a controlled braking of the vehicle or a control intervention such as a driving stability control intervention (ESP) or any other control intervention such as slip control in particular.

The piston 2 with one end abuts indirectly by way of a roller bearing on a driving eccentric, which is set rotating by means of a shaft of an electric motor not shown. A resetting spring 5 is inserted between a carrier 6 for a non-return valve 7 (pressure valve) and the piston 2.

As can be taken from FIG. 1, a non-return valve 7 configured as a pressure valve is used for the ventilation of the working chamber 11. For this purpose, a valve member 8 is pressed by a spring 9 permanently into a closing position for abutment on a carrier-side sealing seat 10. Only in a pressure stroke of the piston 2 will the pressure difference applied to the valve member 8 overcome the active spring forces so that the valve member 8 moves into the non-illustrated opening position for the ventilation of the working chamber 11, with the result that the outlet of pressure fluid out of the working chamber 11 takes place. The pressure fluid outlet A is closed in the aspiration stroke, and the pressure fluid propagates into the working chamber 11 through a non-return valve 12 provided in an inlet E and being shown in the closing position.

The carrier 6 has a bipartite design and includes a disc-shaped bottom 13 on which the sealing seat 10 for the non-return valve 7 is provided. A bottom 13 contains a through-bore to the pressure fluid passage from the working chamber 11 into the outlet A. A bowl-shaped second part 14 is attached to the bottom 13 and receives a bowl 15 for the spring 9. On a side opposite the second part 14, there is a cage 16 for the packet-type preloaded resetting spring 5, said cage including two cage parts 16, 17 and, in addition, a bowl-shaped spring retainer 19 for abutment and centering of the resetting spring 5 on the piston 2. In the completely assembled condition, the spring retainer 19 abuts on a frontal piston end and overlaps with a bowl wall 30 the piston 2 at least in part in the area of the piston end 31. An operative clamping engagement between spring retainer 19 and piston 2 is possible.

As can be seen, also the cage parts 17, 18 are designed as bowl-type sheet-metal shaped parts with a cylindrical wall and with a brim 29 or a bottom 27, on which in each case one end of the resetting spring 5 is movable into abutment.

In the mounted condition of the supply device, the brim 29 with an outside surface retains a piston seal 33 in its position within the stepped bore 3. Upon delivery of the cage subassembly, however, the spring retainer 19 bears against an inside surface of brim 29. In a combined solution, the cage parts 16, 17 can principally have a guiding and bushing function for the piston 2 and, further, an integrated retaining function for one or both of the non-return valves 7, 12.

Depending on the desired adaptation of the supply device, the cage parts 17, 18 can have corresponding apertures 28. When a low-cost protection again foreign objects is desired, the apertures 28 can be designed like a sieve in order to protect the pressure valve against contamination and produce a filtering effect. To improve the low-temperature behavior in the case of a viscous pressure fluid, the cage parts 16, 17 can include extended apertures 28 in the cylindrical wall and in the bottom 27 that can be covered by filter screens. However, if a sufficient number of unused locking recesses 25, 26 are provided, their opening cross-section may already be adequate to allow a good aspiration behavior so that attention to a good discharge performance out of the working chamber 11 must only be paid in the area of the bottom 27. For this purpose, the bottom 27 can be provided with generous apertures 28 and, in case of need, with additional filter screens. The cage 16 can be equipped with apertures 28 until its stability limit because the cage effect is only needed until the final assembly of the supply device. The cage effect is no more required in the operation of the supply device. For this reason, as little material as possible is used for the cage parts 17, 18. Only a combined solution departs from this principle.

In an essential feature of the invention, the cage parts 17, 18 are so configured that they accommodate the resetting spring 5 and, additionally, serve both as a tool and as cage 16 for preloading purposes. The cage parts 17, 18 provided with fastening means 20 are locked by means of displacement of these cage parts 17, 18 relative to each other, while preloading the resetting spring 5 simultaneously. Separate process steps for fastening the cage parts 17, 18 to each other are omitted.

A locking engagement is provided for the mutual attachment of the cage parts 17, 18, and two equal as well as diametrically opposite protruding locking arms 21, 22 are provided at the cage part 17, the free arm ends 23, 24 engaging in a form lock into each one locking recess 25, 26 at the other cage part 17, 18. It is, however, also possible to arrange each one locking arm and each one locking recess at each cage part 17, 18 so that the fastening means 20 are provided in pairs, yet unlike each other. It is furthermore feasible to refrain from the pairwise arrangement of the fastening means 20 by e.g. providing an odd number of fastening means 20, e.g. three in each case.

Preferably, each cage part 17, 18 has at the end of its cylindrical wall—that is preferably at a point which is the first to get into engagement with the opposite cage part 17, 18—a distinctly rounded or conically tapered guiding portion 32 for the radial centering and guiding of the other cage part 18, 17 to be fastened. According to FIG. 3, the guiding portion 32 is situated at the cage part 18, what is, however, also possible vice-versa or generally at both cage parts 17, 18. More specifically, the associated cage parts 17, 18 can quasi align automatically relative to each other by means of guiding portion 32 during their process of approach. All guiding portions 32 are so designed that the space requirement in the accommodating member 4 is not unnecessarily increased. This necessitates a general orientation of the guiding portions 32 radially to the inside. Spaced axially from the guiding portion 32 and spaced from the fastening means 20 is an accommodating portion by which the cage 16 is accommodated in particular in an indentation of bottom 13 in operative or positive engagement for forming a modular unit. Both the guiding portion 32 and the accommodating portion are generally disposed on a common diameter of the tubular wall of the respective cage part 17, 18.

Figure 5:
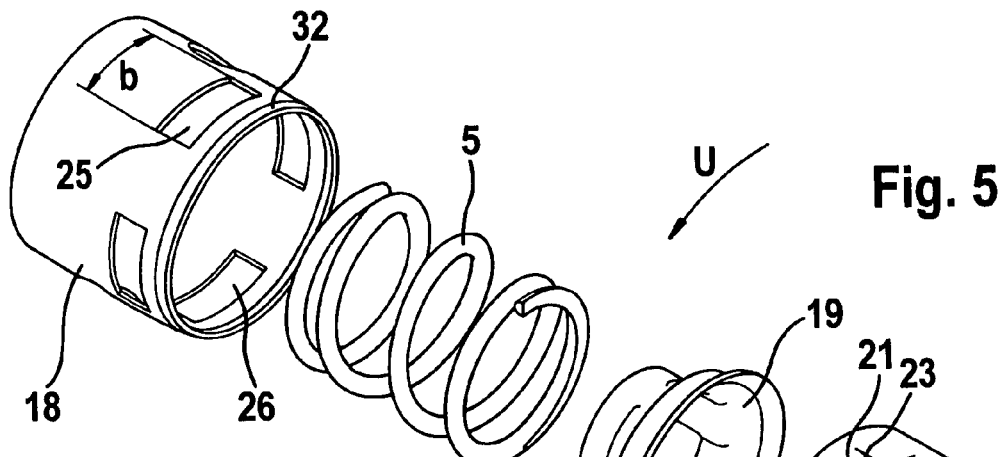
FIG. 5 is an explosive view of the components of the cage according to FIG. 4.
Figure 4:
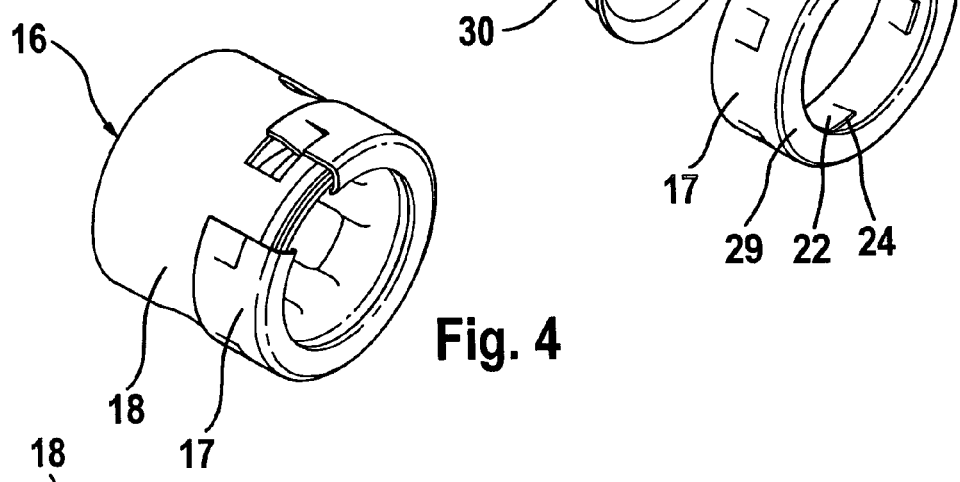
FIG. 4 is a perspective view of a second embodiment of a cage in the mounted condition.

Primarily one embodiment has been described hereinabove which requires an accurately aligned feeding of the cage parts in a cage-part circumferential direction U during the assembly process in order that the fastening means 20 become active. Advantageously, this requirement can be circumvented by a variant according to FIGS. 4 to 6. As can easily be seen in FIGS. 4 to 6, the cage parts 17, 18 have a larger number of locking arms 21, 22 than locking recesses 25, 26, and the locking arms 21, 22 have a width B in the cage-part circumferential direction U which is considerably smaller than the corresponding width b of the locking recesses 25, 26 (with respect to the cage-part circumferential direction U). Due to this provision, cage parts 17, 18 being twisted relative to one another as desired can be paired with each other for locking purposes, without the need for a separate indexing of components or a separate alignment. It is only necessary to pay attention that the correct sides of the cage parts 17, 18 with their fastening means 20 lie opposite each other, what can be polled or safeguarded in a simple manner. Combined with the guiding portions 32 for a radial centering of the cage parts 17, 18, this variant allows an especially favorable, because process-reliable, assembly. The absolute number of locking arms and locking recesses as well as their absolute dimensioning in the cage-part circumferential direction U can be varied in many ways within the limits that the number of all locking arms 21, 22 must be larger than the number of all locking recesses. In the embodiment shown, six locking arms 21, 22 having the width B and four locking recesses 25, 26 having the width b are provided as an example only.

Figure 6:
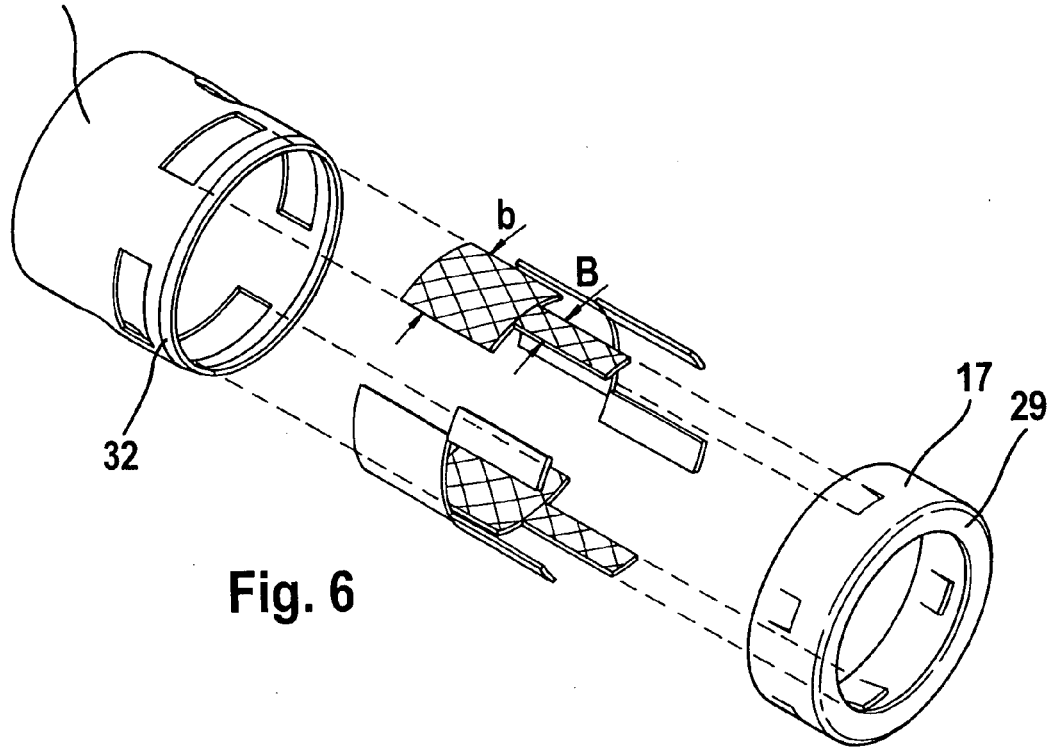
FIG. 6 is a perspective sketch for illustrating the overlapping of fastening means on cage parts.

Eventually, FIG. 6 shows in a perspective view two cage parts 17, 18, and the interposed sketch shows fields with a defined width and arrangement in the cage-part circumferential direction U, which correspond to the actual arrangement of a corresponding fastening means at a cage part. More specifically, the width B, b of the locking arms 21, 22 and locking recesses 25, 26 is plotted, and effective locking exists in this area only if the width B is congruent with the width b. All other fastening means 20, which are not congruent or only in part, remain without effect. As is shown in FIG. 6, congruence prevails only in the area of the crosshatched fields so that only those fastening means 20 are effective which are basically diametrically opposite each other, whereby a defined locking of the cage 16 is ensured.

It is to be understood that the invention is expressly not limited to the casing of piston resetting springs of supply devices for slip-controlled brake systems (ABS, TCS, ESP).

Therefore, it shall be mentioned as an example only that an extension to spring assemblies of non-return valves with two or more cage parts and one resetting spring for elastically preloading a closure member in the direction of a sealing seat is possible without departing from the basic idea of the invention. For further simplification, the sealing seat can be integrated at a cage part.

LIST OF REFERENCE NUMERALS 1 supply device
2 piston
3 bore
4 accommodating member
5 resetting spring
6 carrier
7 non-return valve
8 valve member
9 spring
10 sealing seat
11 working chamber
12 non-return valve
13 bottom
14 part
15 bowl
16 cage
17 cage part
18 cage part
19 spring retainer
20 fastening means
21 locking arm
22 locking arm
23 end
24 end
25 locking recess
26 locking recess
27 bottom
28 aperture
29 brim
30 bowl wall
31 piston end
32 guiding portion
33 piston seal
U cage-part circumferential direction
B width (locking arm)
B width (locking recess)

The invention claimed is:

1. A supply device for the supply of pressure fluid into at least one vehicle brake comprising:
   a piston movably arranged in an accommodating member,
   a carrier bearing a non-return valve arranged coaxially with respect to the piston for ventilating a working chamber into which the piston plunges,
   a resetting spring arranged between the carrier and the piston,
   a multi-part cage assembly comprising a plurality of separate cage parts for accommodating the resetting spring into the plurality of separate cage parts, wherein the resetting spring is caged and simultaneously elastically preloaded under the relative displacement of the plurality of separate cage parts,
   fastening means for locking the multi-part cage assembly comprising at least two locking arms formed on a first cage part and at least two holes formed on a second cage part, each locking arm of the first cage part having a resiliently deformable and unconstrained end configured for engaging a hole of the second cage part upon relative displacement of the first and second cage parts,
   wherein one of the first and second cage parts has a cylindrical wall forming a carrier-side engagement area with which the multi-part cage assembly is accommodated in the carrier such that the multi-part cage assembly forms a modular unit, and wherein a carrier-side accommodating area of the one of the first and second cage parts is axially spaced from the fastening means of the plurality of separate cage parts.

2. The supply device as claimed in claim 1, wherein at least one of the first and second cage part includes a separate guiding portion for radial centering and guiding of the one of the first and second cage part with the other of the first and second cage part.

3. The supply device as claimed in claim 2, wherein the guiding portion of the one of the first and second cage part has a rounded or inclined conical configuration so that a mating portion of the other of the first and second cage part is automatically led into a correct position during locking of the first cage part and the second cage part.

4. A supply device for the supply of pressure fluid into at least one vehicle brake comprising:
   a piston movably arranged in an accommodating member,
   a carrier bearing on a non-return valve arranged coaxially with respect to the piston for ventilating a working chamber into which the piston plunges,
   a resetting spring arranged between the carrier and the piston,
   a multi-part cage assembly comprising a plurality of separate cage parts for accommodating the resetting spring into the plurality of separate cage parts, wherein the resetting spring is caged and simultaneously elastically preloaded under the relative displacement of the plurality of separate cage parts,
   the plurality of separate cage parts comprise fastening means for locking the multi-part cage assembly under the relative displacement of the plurality of separate cage parts,
   a catch-type engagement for fastening the plurality of cage parts to one another, said catch-type engagement comprising locking recesses being provided on at least a first cage part and a plurality of locking arms on at least a second cage part, each locking arm of the second cage part being configured for engagement with a respective locking recess of the first cage part, wherein the second cage part includes a larger number of locking arms than the number of locking recesses of the first cage part, and wherein in a cage-part circumferential direction (U), a width (B) of the locking arms of the second cage part is considerably smaller than a width (b) of the locking recesses of the first cage part so that the first and second cage parts can be locked directly upon twisting the plurality of separate cage parts relative to each other in the cage-part circumferential direction (U).

5. The supply device as claimed in claim 4, wherein one end of the resetting spring is directly movable into abutment on a bottom end of one of the first and second cage part, wherein the other end of the resetting spring is movable into abutment on a brim of the other of the first and second cage part by way of a bowl-shaped spring retainer.

6. The supply device as claimed in claim 5, wherein a bowl wall of the bowl-shaped spring retainer extends at least in part over a piston end of the supply device.

* * * * *